B. W. JACKSON.
MEAT CLAMP.
APPLICATION FILED SEPT. 11, 1907.

923,357.

Patented June 1, 1909.

Inventor
B. W. Jackson.

Witnesses

By

Attorneys

THE NORRIS PETERS CO., WASHINGTON, D. C.

UNITED STATES PATENT OFFICE.

BIRNEY W. JACKSON, OF NEW YORK, N. Y.

MEAT-CLAMP.

No. 923,357.  Specification of Letters Patent.  Patented June 1, 1909.

Application filed September 11, 1907. Serial No. 392,338.

*To all whom it may concern:*

Be it known that I, BIRNEY W. JACKSON, citizen of the United States, residing at New York, in the county of New York and State of New York, have invented certain new and useful Improvements in Meat-Clamps, of which the following is a specification.

The present invention relates to a novel device for holding a piece of meat or the like while carving the same, and aims to provide a meat clamp which is of simple construction and can be readily applied to the meat or disengaged therefrom as may be required.

Figure 1:
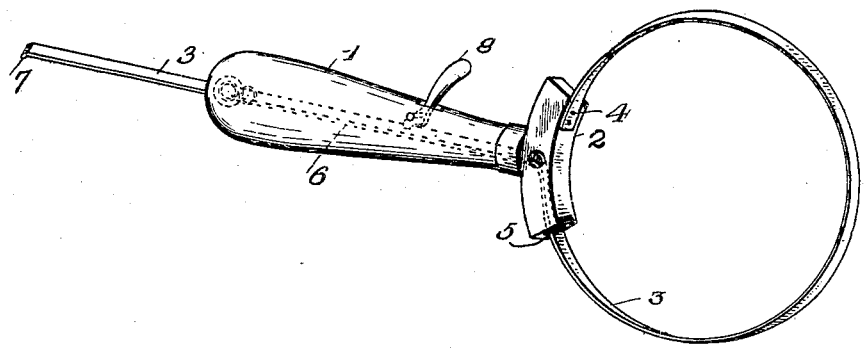
Figure 2:
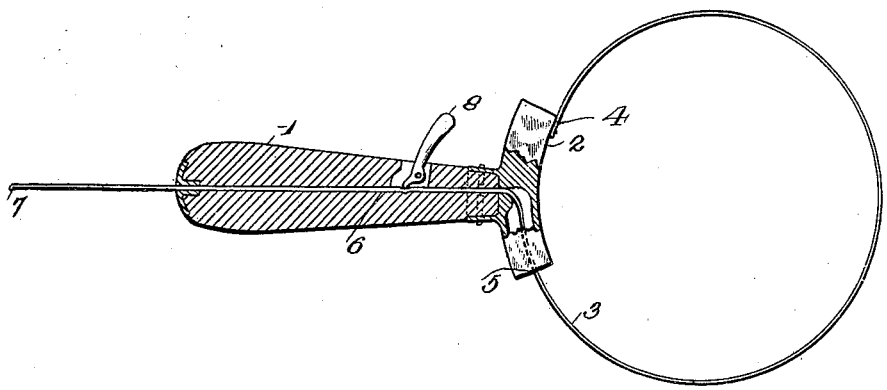

For a full description of the invention and the merits thereof and also to acquire a knowledge of the details of construction and the means for effecting the result, reference is to be had to the following description and accompanying drawings, in which:

Figure 1 is a perspective view of a meat clamp constructed in accordance with the invention. Fig. 2 is a side elevation of the same, portions being shown in section.

Corresponding and like parts are referred to in the following description and indicated in all the views of the drawings by the same reference characters.

Specifically describing the present embodiment of the invention the numeral 1 designates the handle which is of an elongated formation and is provided at one end with a cross head 2. The clamp is constituted of a flexible band carried by the handle and secured to the cross head, the said band forming a loop which can be placed around the meat or member to be engaged and then drawn tightly about the same. This band is indicated at 3 and is preferably formed of a flattened strip of metal, one end of the band being rigidly connected to an end of the cross head 2 at 4 while the opposite end portion of the band passes loosely through an opening 5 in the said cross head. The band then extends through a longitudinal passage 6 in the handle 1 and projects beyond the end of the same where it terminates in a finger-piece 7. With this construction it will be readily apparent that after the band 3 has been placed around the meat the loop formed thereby can be contracted and drawn tightly around the meat by grasping the finger-piece 7 and pulling outwardly upon that end of the band passing loosely through the handle. Pivotally mounted upon the handle 1 at an intermediate point in its length is a lever 8, the inner end of the lever projecting within the passage 6 so as to form a detent to engage the band 3 and prevent slipping of the same, while the opposite end of the lever projects outwardly beyond the handle and constitutes a finger-piece. In applying the clamp the lever 8 is moved out of engagement with the band 3 and the finger-piece 7 moved against the handle 1 so as to enlarge the loop formed by the band to its maximum capacity. The loop is then placed around the meat and drawn tightly around the same by pulling upon the finger-piece 7, all slipping of the band being prevented by causing the lever 8 to engage the same.

Having thus described the invention, what is claimed as new is:

The herein described meat clamp, comprising a handle formed with a longitudinal opening, a cross head disposed at one end of the handle and projecting laterally upon opposite sides thereof so as to obtain an extended bearing upon the meat, one end of the cross head being formed with an opening leading from the extremity of the cross head to the opening through the handle, a flexible band having one end thereof secured to the opposite extremity of the cross head, while the opposite end passes loosely through the opening in the cross head and also through the longitudinal opening in the handle, and a lever pivotally mounted at an intermediate point upon the handle, one end of the lever projecting within the longitudinal opening of the handle to engage the flexible band and prevent backward slipping thereof, while the opposite end projects outwardly beyond the handle to form a finger piece.

In testimony whereof I affix my signature in presence of two witnesses.

BIRNEY W. JACKSON. [L. S.]

Witnesses:
 CARL BÖHMLER,
 JOHN COTTON.